United States Patent [19]

Hartmann

[11] 4,426,169
[45] Jan. 17, 1984

[54] TYPEWRITING RIBBON WITH ADHESIVELY CORRECTABLE PRINT

[75] Inventor: Heinz Hartmann, Mönchaltdorf, Switzerland

[73] Assignee: Franz Büttner AG, Zürich, Switzerland

[21] Appl. No.: 298,314

[22] Filed: Sep. 1, 1981

[30] Foreign Application Priority Data

Sep. 9, 1980 [CH] Switzerland .......................... 6776/80

[51] Int. Cl.$^3$ ............................................. B41J 31/02
[52] U.S. Cl. ................................. 400/241.1; 400/696; 585/1; 260/DIG. 38; 106/32; 428/488; 428/523; 428/914
[58] Field of Search ...................... 400/241.1, 696, 241; 106/32, 26, 31; 428/914, 523, 484, 488; 585/1, 2; 260/DIG. 38

[56] References Cited

U.S. PATENT DOCUMENTS 3,519,456  7/1970  Reed et al. ................... 400/241.1 X
3,825,470  7/1974  Elbert et al. .................... 428/474.4

Primary Examiner—Alexander S. Thomas
Attorney, Agent, or Firm—Karl F. Ross; Herbert Dubno

[57] ABSTRACT

A lift-off adhesively erasable typewriter ribbon contains, in a pigmentatious layer on the substrate strip, in addition to the pigment and a resin binder, a halogenated hydrocarbon modifier containing at least 14 carbon atoms serving to embrittle the resin binder and facilitate transfer of the layer from the ribbon to the paper during the writing process and to allow clean and adhesive removal of print if a correction is required.

6 Claims, 1 Drawing Figure

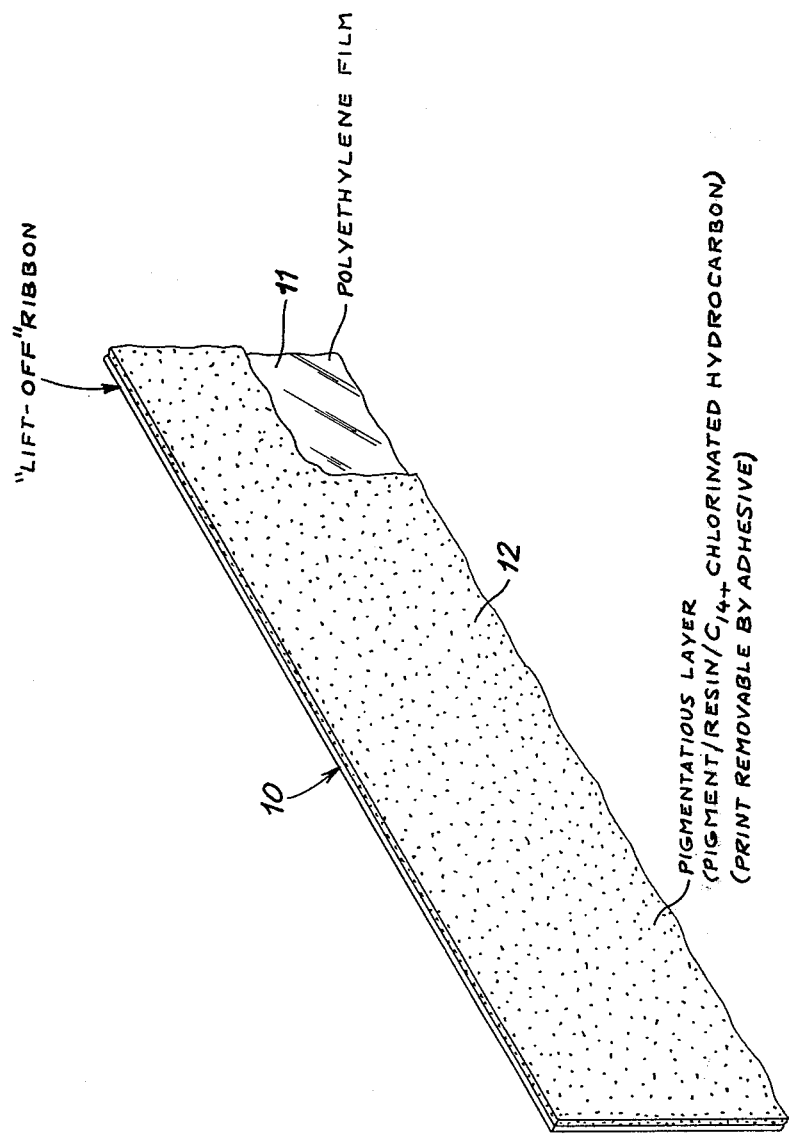

TYPEWRITING RIBBON WITH ADHESIVELY CORRECTABLE PRINT

FIELD OF THE INVENTION

My present invention relates to improvements in lift-off typewriter ribbons and, more particularly, to adhesively eradicable transfer media of the type in which impact serves to transfer a pigment composition from a ribbon substrate to a paper and the transferred composition can be "lifted off" from the paper by applying an adhesive surface thereto.

BACKGROUND OF THE INVENTION

In recent years, correction-type ribbons have gained increasing use in the typewriter field, use of such ribbons replacing to a large degree the earlier corrective methods designed to eliminate a typewritten error from the page.

Prior to the development of adhesively eradicable transfer compositions, the typewriter ribbon comprised a pigment layer which was bonded more or less strongly to the paper when applied thereto by the type face of a typewriter. Correction was effected by erasure or by the application of opaque white layer to the printed letter thereby allowing the error to be overturned and correction made.

With the advent of adhesively eradicable or lift-off correction ribbons, the approach changed from one which involved coating the error to a simplified removal technique in which, after the typewritten error was made, the imprint was removed from the paper by applying an adhesive surface thereto. The imprint was formed by a composition containing a pigment, a film-forming resin binder and a modifier designed to facilitate transfer of the pigment composition from the ribbon, e.g. a polyethylene tape, to the paper and prevent premature bonding of the composition on the paper.

In U.S. Pat. No. 3,825,470, for example, the pigment layer was applied to the tape substrate in a solvent dispersion and contained, apart from the pigment or an insoluble organic coloring agent, a resin binder and one or more modifying agents which serve to harden the binder and embrittle the latter so that it has a predetermined frangibility reducing its adhesion to the substrate. If the transferred pattern was not removed from the paper, the transfer eventually became more or less permanent.

The modifying agent was preferably a mixture of mineral oil and fatty acid esters selected from the group which consists of the octyl esters of fatty acids, isopropylpalmitate, butyl-stearate and mixtures thereof.

OBJECT OF THE INVENTION

It is the principal object of the present invention to improve upon the method and product described in the aforementioned patent.

DESCRIPTION OF THE INVENTION

I have now found that it is possible to improve upon the compositions of the type described in the aforementioned patent in that more complete removal of the composition from a paper to which it has been applied is possible and in addition I can simplify the mixture of the product and reduce the amount of the modifying agent therein when, in place of all or some of the modifying agents of that patent, one utilizes a halogenated hydrocarbon (e.g. a chlorinated paraffin) having at least 14 carbon atoms and preferably at most 28 carbon atoms.

According to the invention, therefore, an adhesive correction ribbon for typewriters and the like comprises a color-transfer print-forming (pigmentatious) layer on a carrier or substrate, e.g. a polyethylene strip, this layer consisting essentially of a pigment or other coloring agent, a synthetic resin binder and an embrittling modifying agent which at most is only partly compatible with the binder, the modifying agent consisting of or being formed at least in part by an effective amount of halogenated hydrocarbon having at least 14 carbon atoms.

The most preferred modifying agents are chlorinated hydrocarbons of at least 14 carbon atoms and at most 18 carbon atoms and, more specifically, monochlorinated hydrocarbons within this carbon range, with the most effective results being obtained with cetyl chloride and stearyl chloride. These chlorinated hydrocarbons can form exclusive modifying agents or can be used in conjunction with secondary modifying agents which are capable of weakening the cross linking or binding of the binder, e.g. the modifying agents mentioned in the aforementioned patents and especially higher carboxylic acid esters.

The modifying agents in the present invention can be utilized in amounts up to 50% by weight with reference to the dry weight of the pigment layer of the ribbon and up to this amount of chlorinated hydrocarbons can be utilized within the scope of the present invention. When secondary modifiers are also utilized, the chlorinated hydrocarbon proportion can be reduced to about 5% by weight.

The typewriter ribbon of the present invention can be made in the usual manner. Generally a stock solution is prepared containing the synthetic resin binder in any conventional solvent. Of course, both binders and solvents of the type utilized in the aforementioned patent can be employed here as well. The solvent is preferably a mixture of toluol and isopropanol. The binder solution is then mixed with the halogenated hydrocarbon and, if desired, with secondary modifying agents and the pigment is then dispersed in this mixture to form a dispersion which can be brought to the desired consistency with additional portions of solvent.

The dispersion is then applied to a carrier or substrate, e.g. a polyethylene film, by a conventional coating apparatus and dried, e.g. in heated air. The coating should correspond in thickness to 1.5 to 3.0 grams dry weight per $m^2$, preferably 1.8 to 2.3 grams per $m^2$ dry weight.

BRIEF DESCRIPTION OF THE DRAWING

The above and other objects, features and advantages of the present invention will become more readily apparent from the following description, reference being made to the accompanying drawing, the sole FIGURE of which is an enlarged perspective view of a portion of a typewriter ribbon according to the invention.

SPECIFIC DESCRIPTION

The sole FIGURE of the drawing shows a typewriter ribbon 10, greatly exaggerated in size, and formed from a substrate 11 which can be a polyethylene film, this substrate being covered with a pigmentatious layer 12 consisting essentially of a pulverulent pigment, a resin film forming binder and one or more modifying agents including a $C_{14+}$ chlorinated hydrocarbon.

SPECIFIC EXAMPLES

Stock Solution 1

10.00 kg. of ethyl cellulose (Aethylcellulose N4 Hercules Powder Company, Delaware) is dissolved in a mixture of 45.00 kg. of toluol and 45.00 kg. of isopropanol to yield a stock solution 1 in an amount of 100 kg., the ethyl cellulose binder being dissolved with stirring.

STOCK SOLUTION 2

A dimer acid-based polyamide resin as utilized for so-called carbon ribbons (Emerez 1533, Emery Industries, Cincinnati, Ohio) is stirred into a mixture of 30 kg. of isopropanol and 30 kg. of toluol in an amount sufficient to make 100 kg. of a stock solution 2.

EXAMPLE I 13.50 kg. of stock solution 1,
4.50 kg. of cetyl chloride,
4.50 kg of atomatic-free aliphatic, naphtheric mineral oil (Ondina 68, Shell Chemical Company, Houston, Texas) are mixed together and
5.00 kg. of carbon black (Regal 400) pigment are stirred into the mixture and the resulting dispersion stirred for 15 minutes in a high-speed stirrer and then passed thrice through a stirring type ball mill.
33.50 kg. of isopropanol and
33.00 kg. of toluol
are then added to bring the product to the desired viscosity and the mixture stirred. The mixture is then coated onto polyethylene film to form a layer of a thickness corresponding to about 2.0 grams per $m^2$ upon drying in warm air.

When the resulting lift-off ribbon was used in an electric typewriter and compared to a ribbon in accordance with the aforementioned patent but without cetyl chloride, the ribbon of this example was found to give a uniformly clearer lift-off of the print.

EXAMPLE II 14.00 kg. of stock solution 2
4.70 kg. of higher fatty acid esters (Lipinol Chemische Werke Hüls)
4.70 kg. of cetyl chloride, are mixed, and
5.00 kg. of carbon black (Regal 400R) is then added and dispersed for 15 minutes in a high-speed rotary stirrer. The dispersion is then doctored onto polyethylene film and dried in warm air to form a covering having a thickness corresponding to about 2.1 grams per $m^2$. The result with this lift-off ribbon was similar to that described with respect to Example I.

EXAMPLE III 5.00 kg. of carbon black pigment (Regal 400R),
9.40 kg. of stearyl chloride and
14.00 kg. of stock solution 2.
were mixed to form a dispersion for 15 minutes in a high speed stirrer. The dispersion was then passed through the ball mill in three passes and
35.8-kg. of isopropanol and
35.80 kg. of toluol
were added thereto. The dispersion was coated onto polyethylene film and dried in warm air to provide an effective lift-off type correction ribbon.

I claim:

1. A lift-off type correction ribbon adapted to transfer a print composition to a sheet from which the composition can be lifted off by an adhesive surface, said ribbon comprising a substrate and a coloring layer on said substrate, said coloring layer comprising at least one pigment, at least one resin binder and an effective amount of a modifying agent capable of embrittling said binder, said modifying agent including at least one halogenated hydrocarbon selected from the group which consists of cetyl chloride and stearyl chloride.

2. The ribbon defined in claim 1 wherein said modifying agent includes a secondary modifier in the form of a higher carboxylic acid ester.

3. The ribbon defined in claim 1 wherein said layer is between 1 and 50% by weight of said chlorinated hydrocarbon with reference to the dry weight of that layer.

4. A lift-off type correctable ribbon adapted to transfer a print composition to a sheet from which the composition can be lifted off by an adhesive surface, said ribbon comprising a substrate and a coloring layer on said substrate, said coloring layer comprising at least one pigment, at least one resinous binder and an effective amount of cetyl chloride as a modifying agent capable of embrittling said binder.

5. The ribbon defined in claim 4 wherein said modifying agent includes a secondary modifier in the form of a higher carboxylic acid ester.

6. The ribbon defined in claim 4 wherein said layer is between 1 and 50% by weight of cetyl chloride with reference to the dry weight of said layer.

* * * * *